United States Patent
An et al.

(10) Patent No.: US 11,456,614 B2
(45) Date of Patent: *Sep. 27, 2022

(54) WIRELESS POWER RECEPTION DEVICE

(71) Applicant: Scramoge Technology Limited, Dublin (IE)

(72) Inventors: Jeong Wook An, Seoul (KR); Hyoung Rae Kim, Seoul (KR); Dong Hyuk Lee, Seoul (KR)

(73) Assignee: Scramoge Technology Limited, Dublin (IE)

( * ) Notice: Subject to any disclaimer, the term of this patent is extended or adjusted under 35 U.S.C. 154(b) by 183 days.

This patent is subject to a terminal disclaimer.

(21) Appl. No.: 16/845,741

(22) Filed: Apr. 10, 2020

(65) Prior Publication Data

US 2020/0244106 A1 Jul. 30, 2020

Related U.S. Application Data

(63) Continuation of application No. 16/413,374, filed on May 15, 2019, now Pat. No. 10,651,676, which is a
(Continued)

(30) Foreign Application Priority Data

Aug. 18, 2014 (KR) .................. 10-2014-0107020

(51) Int. Cl.
*H02J 50/10* (2016.01)
*H01F 38/14* (2006.01)
(Continued)

(52) U.S. Cl.
CPC .......... *H02J 7/025* (2013.01); *H01F 27/2804* (2013.01); *H01F 27/2885* (2013.01);
(Continued)

(58) Field of Classification Search
None
See application file for complete search history.

(56) References Cited

U.S. PATENT DOCUMENTS

| 9,607,757 B2 | 3/2017 | Hirobe et al. |
| 10,340,725 B2 | 7/2019 | An et al. |

(Continued)

FOREIGN PATENT DOCUMENTS

| CN | 102882284 A | 1/2013 |
| JP | 2009-200174 A | 9/2009 |

(Continued)

OTHER PUBLICATIONS

European Patent Office, Extended Search Report, Application No. 15833451.6-1202/3185394 PCT/KR2015008075, dated Feb. 20, 2018, 8 pages.
(Continued)

*Primary Examiner* — Jared Fureman
*Assistant Examiner* — Aqeel H Bukhari
(74) *Attorney, Agent, or Firm* — Vorys, Sater, Seymour and Pease LLP

(57) ABSTRACT

A wireless power reception device can include a first shielding member; a second shielding member; a short-range communication coil on the first shielding member; a wireless charging coil on the second shielding member; and a hole outside the wireless charging coil, in which the hole penetrates through the first shielding member.

20 Claims, 6 Drawing Sheets

Related U.S. Application Data continuation of application No. 15/505,016, filed as application No. PCT/KR2015/008075 on Jul. 31, 2015, now Pat. No. 10,340,725.

(51) Int. Cl.

| | | |
|---|---|---|
| *H01F 27/28* | (2006.01) | |
| *H02J 7/00* | (2006.01) | |
| *H01F 27/29* | (2006.01) | |
| *H02J 50/20* | (2016.01) | |
| *H02J 50/12* | (2016.01) | |
| *H02J 7/02* | (2016.01) | |
| *H01F 27/36* | (2006.01) | |

(52) U.S. Cl.
CPC ........... *H01F 27/29* (2013.01); *H01F 27/361* (2020.08); *H01F 27/366* (2020.08); *H01F 38/14* (2013.01); *H02J 7/00* (2013.01); *H02J 7/0042* (2013.01); *H02J 50/10* (2016.02); *H02J 50/12* (2016.02); *H02J 50/20* (2016.02)

(56) References Cited

U.S. PATENT DOCUMENTS

| | | |
|---|---|---|
| 10,651,676 B2 | 5/2020 | An et al. |
| 2008/0278275 A1 | 11/2008 | Fouquet et al. |
| 2010/0320843 A1 | 12/2010 | Kitamura et al. |
| 2012/0057322 A1 | 3/2012 | Waffenschmidt |
| 2013/0015718 A1 | 1/2013 | Jung et al. |
| 2013/0249302 A1 | 9/2013 | An et al. |
| 2014/0333253 A1 | 11/2014 | Suzuki et al. |
| 2015/0115723 A1* | 4/2015 | Levo ........................ H01F 27/36 307/104 |
| 2015/0170829 A1 | 6/2015 | Waffenschmidt |
| 2016/0003161 A1 | 1/2016 | Grogg et al. |
| 2021/0265109 A1* | 8/2021 | Kurz ................... H01F 27/2847 |

FOREIGN PATENT DOCUMENTS

| | | |
|---|---|---|
| KR | 10-2013-0008972 A | 1/2013 |
| KR | 10-2013-0015244 A | 2/2013 |
| KR | 10-2013-0076067 A | 7/2013 |
| KR | 10-2014-0019955 A | 2/2014 |
| WO | WO 2013/065245 A1 | 5/2013 |

OTHER PUBLICATIONS

International Preliminary Report on Patentability, PCT/KR2015/008075, dated Feb. 21, 2017, 10 pages.
International Search Report, PCT/KR2015/008075, dated Nov. 26, 2015, 2 pages.
Korean Intellectual Property Office, Grant of Patent, Application No. 10-2014-0107020, dispatched on Jun. 16, 2020.
Patent Search Record Information: KR20130076067 A, Application 2015800443182, dated Sep. 18, 2018, 1 page.
The State Intellectual Property Office of People's Republic of China, The First Office Action, Application No. 201580044318.2, dated Sep. 28, 2018, 7 pages.
The State Intellectual Property Office of People's Republic of China, The Second Office Action, Application No. 201580044318.2, dated May 29, 2019, 5 pages.

* cited by examiner

【Fig. 1】
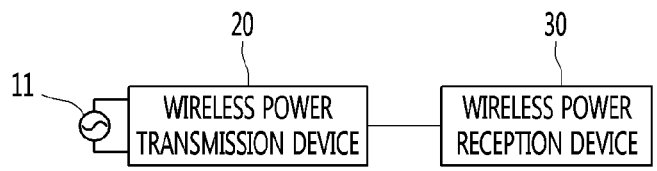
【Fig. 2】
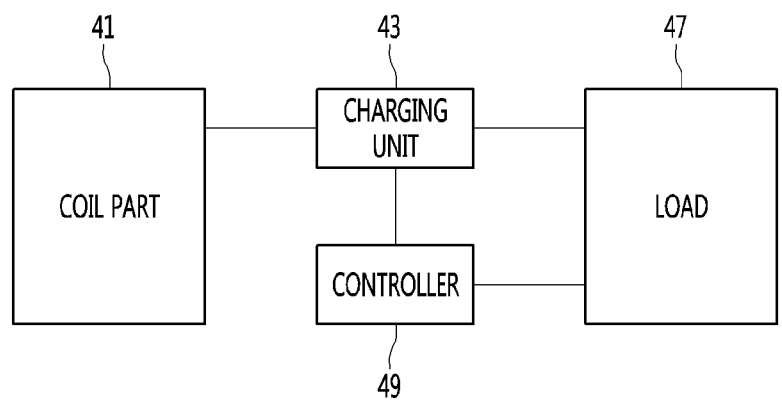

[Fig. 3]
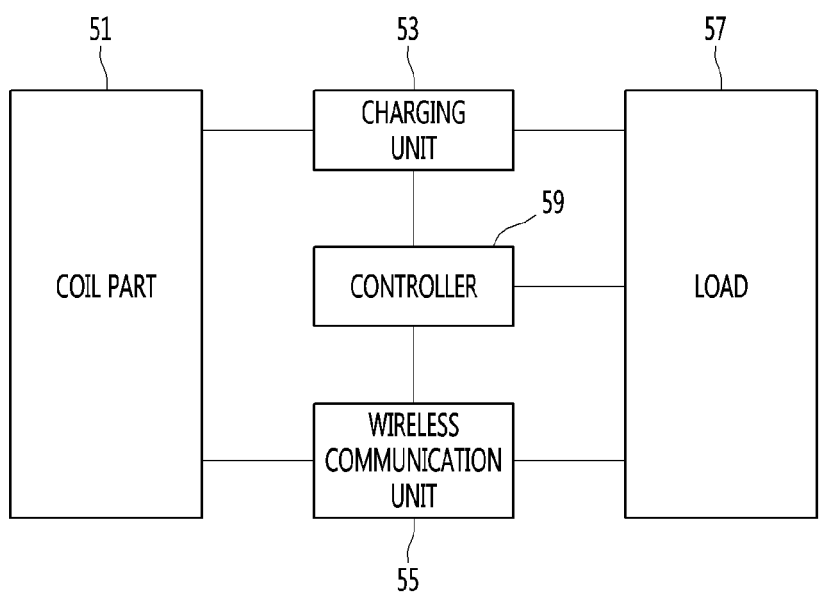

[Fig. 4]
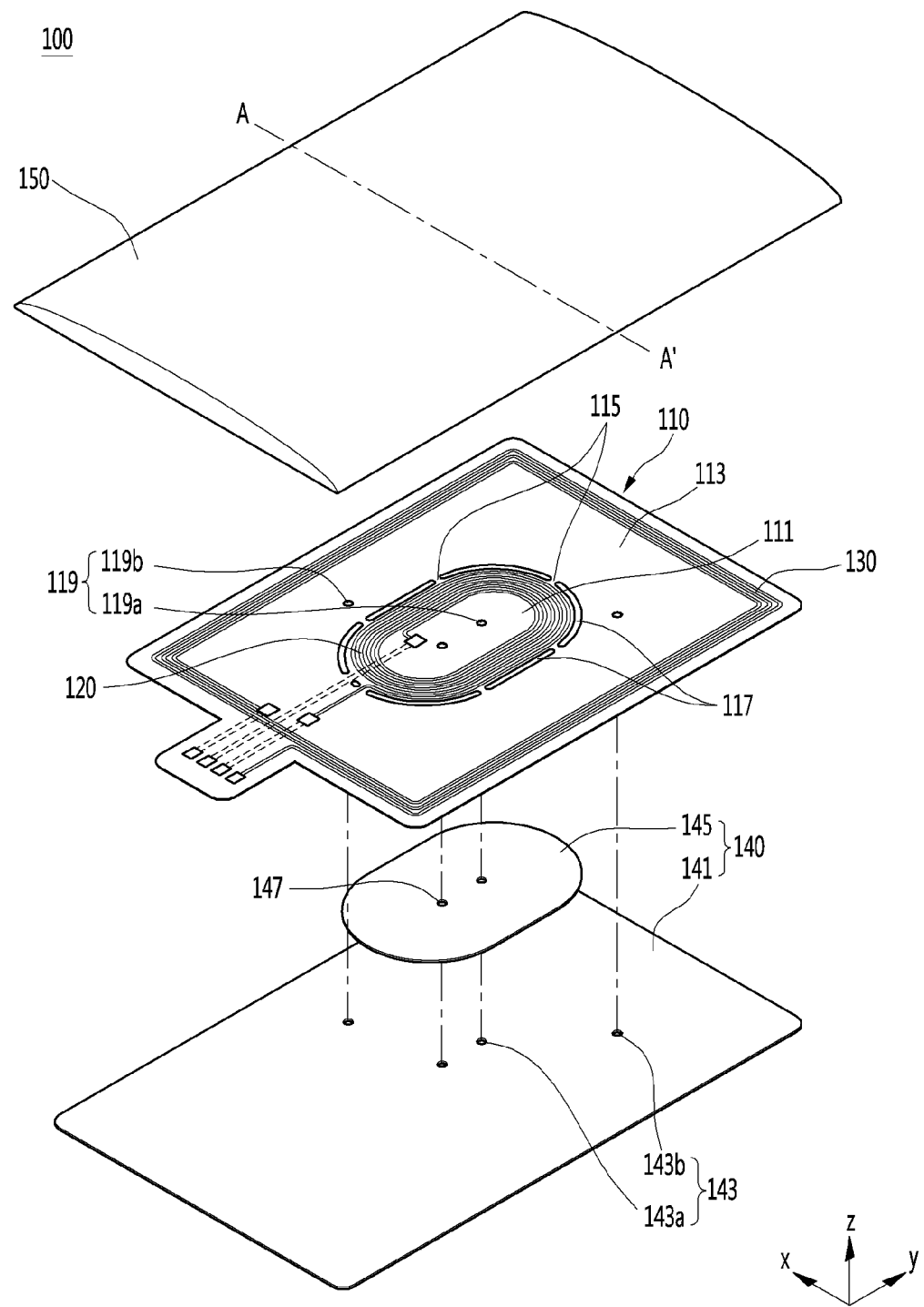

[Fig. 5a]
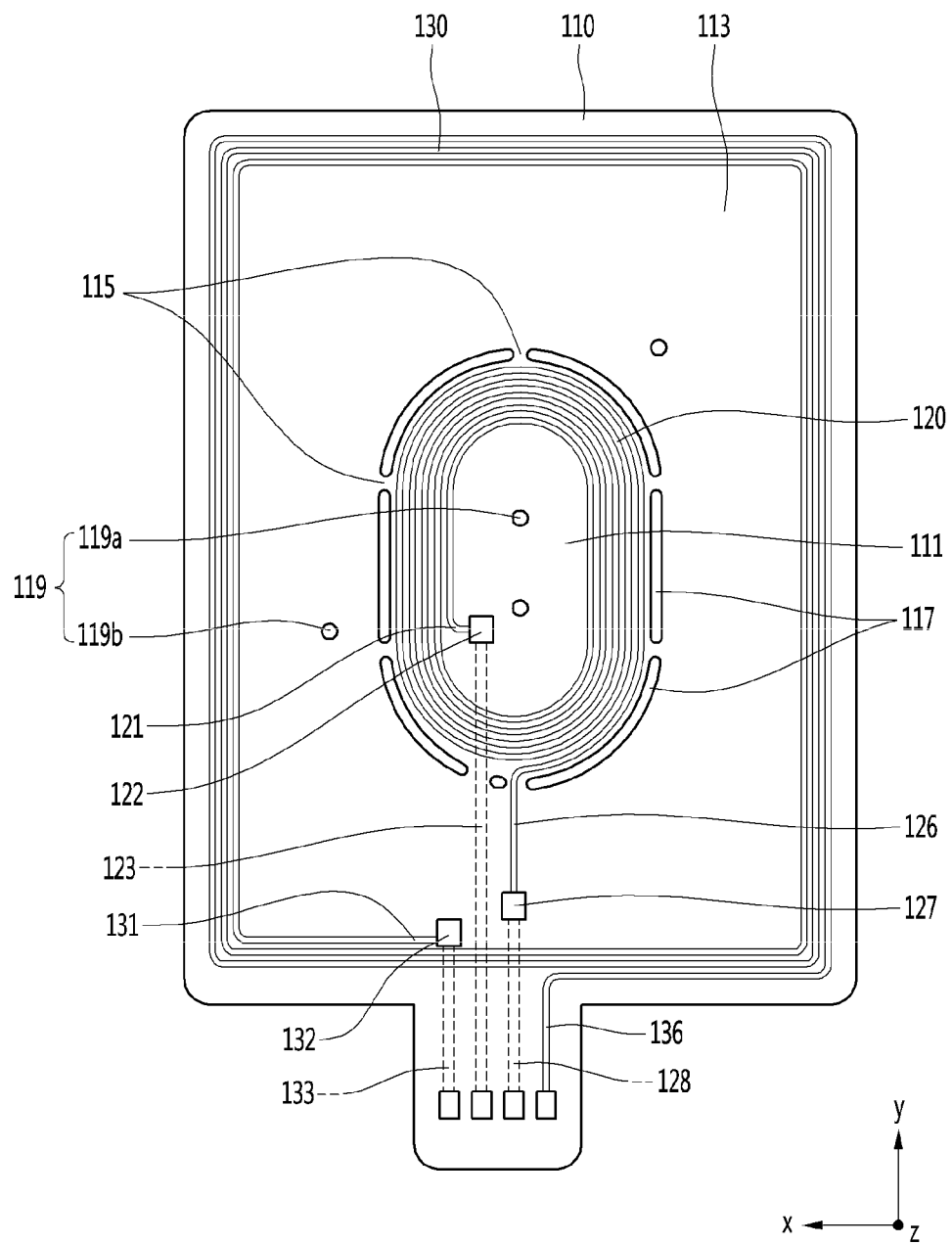

【Fig. 5b】
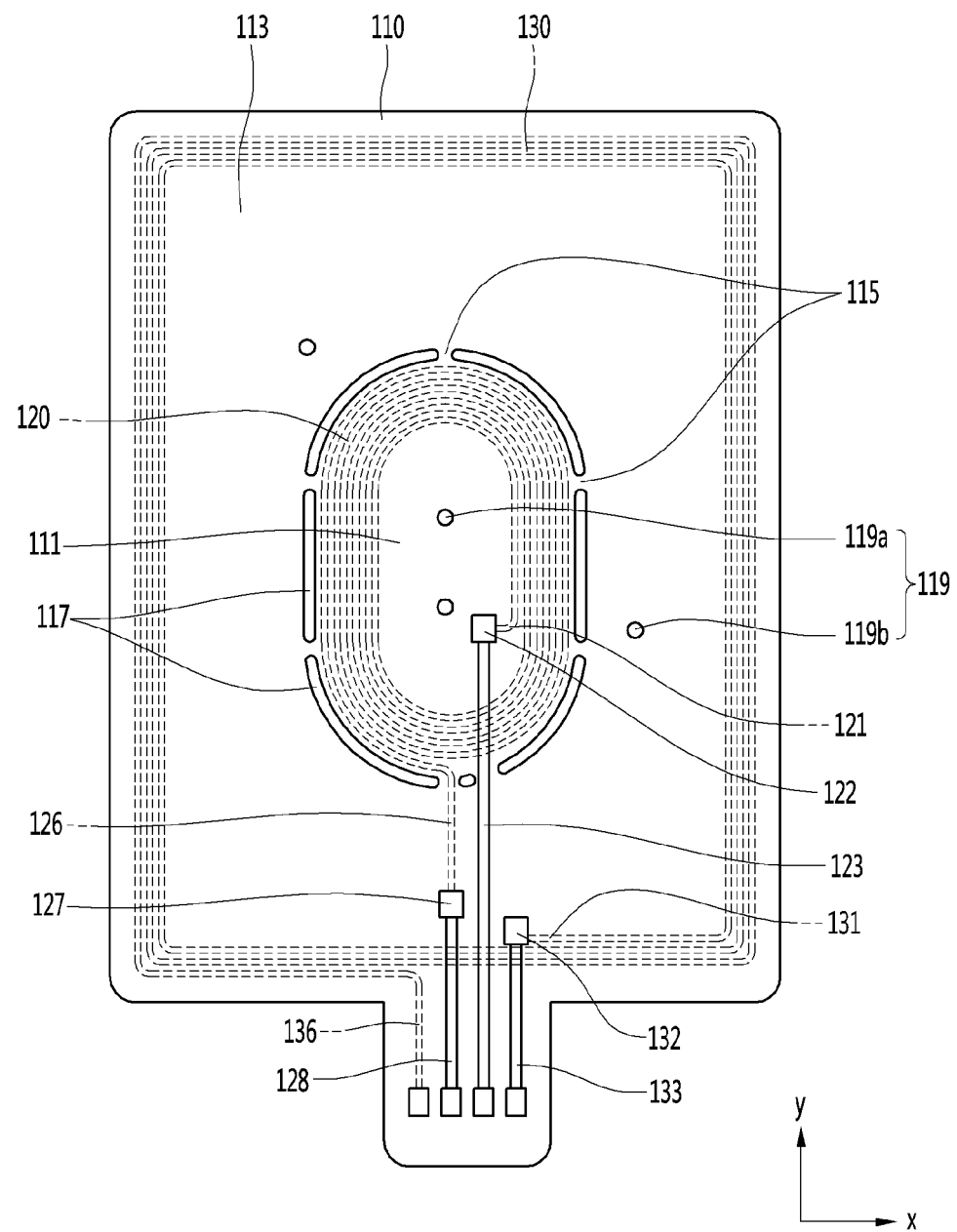

[Fig. 6]
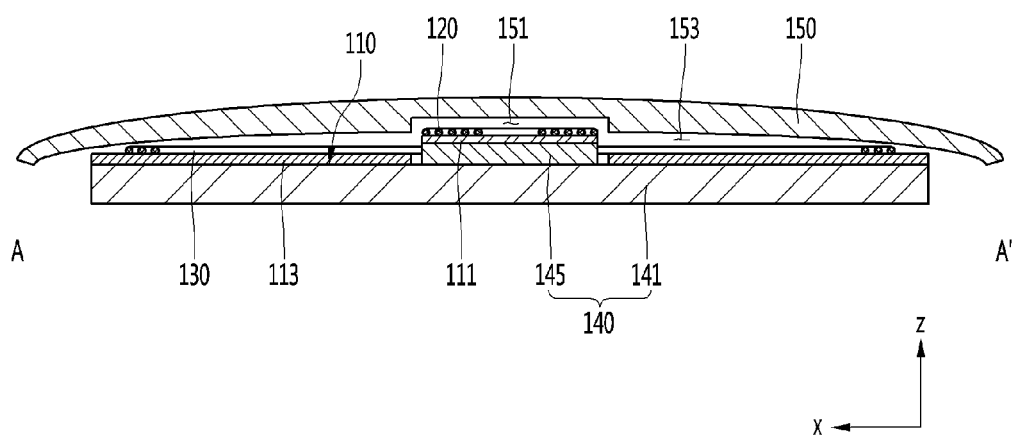

WIRELESS POWER RECEPTION DEVICE

CROSS REFERENCE TO RELATED APPLICATIONS

This application is a Continuation of U.S. patent application Ser. No. 16/413,374, filed on May 15, 2019, which is a Continuation of U.S. patent application Ser. No. 15/505,016, filed on Feb. 17, 2017 (now U.S. Pat. No. 10,340,725, issued Jul. 2, 2019), which is the National Phase of PCT International Application No. PCT/KR2015/008075, filed on Jul. 31, 2015 which claims priority under 35 U.S.C. 119 (a) to Patent Application No. 10-2014-0107020, filed in the Republic of Korea on Aug. 18, 2014, all of which are hereby expressly incorporated by reference into the present application.

TECHNICAL FIELD

The present invention relates to a wireless power charging system and, more particularly, to a wireless power reception device of a wireless power charging system.

BACKGROUND ART

Generally, an electronic apparatus is driven using power stored in a battery. At this time, in the electronic apparatus, the battery may be replaced or recharged. In order to charge the battery, the electronic apparatus includes a contact terminal contacting an external charging device. That is, the electronic apparatus is electrically connected to the charging device through the contact terminal. The contact terminal of the electronic apparatus is externally exposed and thus may be contaminated by foreign materials or short circuited by humidity. In this case, since contact failure occurs between the contact terminal and the charging device, the battery of the electronic apparatus may not be charged.

In order to solve the above-described problem, a wireless power charging system has been proposed. The wireless power charging system includes a wireless power transmission device and a wireless power reception device. Here, the electronic apparatus is implemented by a wireless power reception device. The wireless power charging system may use various charging methods. At this time, in order to receive power from the wireless power transmission device, a predetermined charging method pre-set in the wireless power transmission device should be pre-set in the wireless power reception device. To this end, if the charging methods of the wireless power transmission device and the wireless power reception device are different, the wireless power reception device may not receive power from the wireless power transmission device.

DISCLOSURE

Technical Problem

Accordingly, the present invention proposes a wireless power reception device for efficiently receiving power. The present invention provides a wireless power reception device for receiving power according to a plurality of charging methods.

Technical Solution

According to an aspect of the present invention, there is provided a wireless power reception device including an inner coil, a mounting member having the inner coil mounted thereon and a slit formed in an edge of the inner coil, and a first shielding member and a second shielding member laminated on the first shielding member and provided in correspondence with the inner coil, the mounting member being mounted on the first shielding member and the second shielding member.

The mounting member may include an inner mounting member provided inside the slit and having the inner coil mounted thereon and an outer mounting member provided outside the slit.

The mounting member may further include at least one bridge traversing the slit and connecting the inner mounting member and the outer mounting member.

The wireless power reception device may further include an outer coil mounted on the outer mounting member and surrounding the inner coil.

According to another aspect of the present invention, there is provided a wireless power reception device including a mounting member including an inner mounting member and an outer mounting member surrounding the inner mounting member and an inner coil provided on the inner mounting member. The mounting member includes a plurality of slits formed in a boundary region between the inner mounting member and the outer mounting member and surrounding the inner coil, and the inner mounting member and the outer mounting member have a step difference at a position corresponding to the slits.

The mounting member may further include at least one bridge connecting the inner mounting member and the outer mounting member.

The wireless power reception device may further include a first shielding member and a second shielding member laminated on the first shielding member and provided in correspondence with the inner coil, and the mounting member may be mounted on the first shielding member and the second shielding member.

The wireless power reception device may further include a cover having an outer accommodation groove accommodating the outer mounting member and an inner accommodation groove accommodating the inner mounting member.

Advantageous Effects

A wireless power reception device according to the present invention includes a plurality of coils. At this time, a shielding member shields an electromagnetic field of each coil. That is, the shielding member isolates the coils from the other components of the wireless power reception device. Therefore, the coils may operate without performance deterioration. In addition, when the coils operate, the shielding member protects the other components of the wireless power reception device from the electromagnetic field. Therefore, the wireless power reception device may receive power using the plurality of charging methods. Accordingly, it is possible to improve efficiency of the wireless power reception device.

DESCRIPTION OF DRAWINGS

FIG. 1 is a block diagram showing a general wireless power charging system.

FIG. 2 is a block diagram showing an example of a wireless power reception device according to the present invention.

FIG. 3 is a block diagram showing another example of a wireless power reception device according to the present invention.

FIG. 4 is an exploded perspective view showing a coil part according to an embodiment of the present invention.

FIGS. 5a and 5b are plan views showing a mounting member of FIG. 4.

FIG. 6 is a cross-sectional view taken along line A-A' of FIG. 4.

BEST MODE

Hereinafter, the embodiments of the present invention will be described in detail with reference to the accompanying drawings, in which the same or similar portions are denoted by the same reference numerals. In describing the present invention, a detailed description of known functions and configurations will be omitted when it may obscure the subject matter of the present invention.

FIG. 1 is a block diagram showing a general wireless power charging system.

Referring to FIG. 1, generally, the wireless power charging system 10 includes a wireless power transmission device 20 and a wireless power reception device 30.

The wireless power transmission device 20 is connected to a power supply 11 to receive power from the power supply 11. Here, the wireless power transmission device 20 may supply alternating current (AC) power. In addition, the wireless power transmission device 20 wirelessly transmits power. In addition, the wireless power transmission device 20 transmits power according to various charging methods. Here, the charging methods include an electromagnetic induction method, a resonance method and a RF/Micro Wave Radiation method.

At this time, at least one of the charging methods may be pre-set in the wireless power transmission device 20. The wireless power transmission device 20 may transmit power using the pre-set charging method. If at least two of the charging methods are pre-set, the wireless power transmission device 20 may select any one of the pre-set charging methods in correspondence with the wireless power reception device 30.

The wireless power reception device 30 receives power from the wireless power transmission device 20. Here, the wireless power reception device 30 may receive AC power. The wireless power reception device 30 receives power according to various charging methods. Here, the charging methods include an electromagnetic induction method, a resonance method and a RF/Micro Wave Radiation method. In addition, the wireless power reception device 30 is driven using power. Here, the wireless power reception device 30 may convert AC power into DC power and use the DC power.

At this time, at least one of the charging methods may be pre-set in the wireless power reception device 30. In addition, the wireless power reception device 30 may receive power using the pre-set charging method. Here, if at least two charging methods are pre-set, the wireless power reception device 30 may select any one of the pre-set charging methods in correspondence with the wireless power transmission device 20.

Here, in order for the wireless power transmission device 20 to transmit power to the wireless power reception device 30, the charging method of the wireless power transmission device 20 should be equal to that of the wireless power reception device 30.

FIG. 2 is a block diagram showing an example of a wireless power reception device according to the present invention.

Referring to FIG. 2, the wireless power reception device 40 of this example includes a coil part 41, a charging unit 43, a load 47 and a controller 49. At this time, the wireless power reception device 40 may be implemented in various electronic apparatuses.

The coil part 41 wirelessly receives power. The coil part 41 receives power according to the plurality of charging methods. Here, the charging methods include an electromagnetic induction method, a resonance method and a RF/Micro Wave Radiation method. At this time, the coil part 41 includes at least one coil. Here, the coil part 41 may include a plurality of coils. The coils may receive power according to different charging methods. In addition, the coil part 41 may receive AC power from the wireless power transmission device 20.

The charging unit 43 converts power. Here, the charging unit 43 may receive AC power from the coil part 41 and convert AC power into DC power. In addition, the charging unit 43 may include a rectifier circuit, a smoothing circuit and a battery. The rectifier circuit may convert AC power into DC power. The smoothing circuit may remove an AC component from DC power. The battery may store DC power.

The load 47 is driven using power. Here, the load 47 may be driven using DC power received from the charging unit 43. At this time, if the wireless power reception device 40 is implemented in an electronic device, the load 47 may directly perform the additional function of the electronic apparatus.

The controller 49 may perform overall operation related to wireless charging in the wireless power reception device 40. At this time, the controller 49 may detect the amount of power received by or stored in the charging unit 43. The controller 49 may detect the amount of power discharged from the charging unit 43. To this end, the controller 49 may control operation of the charging unit 43.

FIG. 3 is a block diagram showing another example of a wireless power reception device according to the present invention.

Referring to FIG. 3, the wireless power reception device 50 of this example may include a coil part 51, a charging unit 53, a wireless communication unit 55, a load 57 and a controller 59. At this time, the components of the wireless power reception device 50 are similar to those of the above-described example and thus a detailed description thereof will be omitted.

In this example, the coil part 51 includes a plurality of coils. At this time, at least one of the coils wirelessly receives power. Another coil transmits and receives a wireless signal. Another coil may be implemented by an antenna to transmit and receive a wireless signal in the air.

The wireless communication unit 55 processes a wireless signal. The wireless communication unit 55 processes the wireless signal according to a predetermined communication method. At this time, the wireless communication unit 55 processes a transmitted signal as a wireless signal or processes a wireless signal as a received signal. Here, the communication method includes a short-range communication method. For example, the short-range communication method includes a near field communication (NFC) method.

The controller 59 performs overall operation related to wireless charging and wireless communication in the wireless power reception device 50. At this time, the controller 59 may detect the amount of power received by or stored in the charging unit 53. The controller 59 may detect the amount of power discharged from the charging unit 53. To this end, the controller 59 may control operation of the charging unit 53. In addition, the controller 59 may control the wireless communication unit 55 in correspondence with operation of the load 57.

FIG. 4 is an exploded perspective view showing a coil part according to an embodiment of the present invention. FIGS. 5a and 5b are plan views showing a mounting member of FIG. 4. FIG. 5a shows the upper surface of the mounting member and FIG. 5b shows the lower surface of the mounting member. FIG. 6 is a cross-sectional view taken along line A-A' of FIG. 4. Referring to FIGS. 4, 5a, 5b and 6, the coil part 100 of the present embodiment may include a mounting member 110, an inner coil 120, an outer coil 130, a shielding member 140 and a cover 150.

The mounting member 110 may have a rectangular shape and have rounded corners.

The outer coil 130 may extend along the edge of the mounting member 110. The outer coil 130 may be curved with a predetermined curvature in each corner of the mounting member 110.

In addition, the inner coil 120 may be arranged in the center region of the mounting member 110. The inner coil 120 may have a circular, elliptical or rectangular shape or may be rounded in regions corresponding to the corners of the mounting member 110 with a predetermined curvature.

The mounting member 110 supports the inner coil 120 and the outer coil 130. At this time, the mounting member 110 has a single-layer structure or a multi-layer structure. Here, the mounting member 110 includes a printed circuit board (PCB), a flexible PCB (FPCB) and a film.

Such a mounting member 110 may include an inner mounting member 111, an outer mounting member 113 and at least one bridge 115. The inner mounting member 111 supports the inner coil 120 and the outer mounting member 113 supports the outer coil 130. Here, the outer mounting member 113 surrounds the inner mounting member 111. At this time, a slit 117 is formed in the mounting member 110. The slit 117 is formed between the inner mounting member 111 and the outer mounting member 113. In other words, the slit 117 is formed in the edges of the inner mounting member 111. That is, the slit 117 may be formed in the boundary region between the outer mounting member 113 and the inner mounting member 111. Here, the slit 117 may extend in various shapes such as an elliptical or polygonal shape. That is, the slit 117 may extend in a shape corresponding to that of the inner coil 120 to surround the peripheral part of the inner coil 120. In addition, the inner mounting member 111 is provided inside the slit 117 and the outer mounting member 113 is provided outside the slit 117. The bridge 115 connects the inner mounting member 111 and the outer mounting member 113. To this end, the bridge 115 is formed to traverse the slit 117.

In addition, the slit 117 may be divided into a plurality of slits by the bridge 115 and the lengths of the plurality of slits may be equal or different according to the position of the bridge 115.

In the bridge 115 may be a region through which an extension bar 123 connecting the inner coil 120 and the below-described connection via 127 or a terminal 126 connecting the inner coil 120 and the connection via 127 passes. Accordingly, the position of the bridge 155 formed on the mounting member 110 may be changed according to the position of the extension bar 123 and the terminal 126.

In addition, the outer mounting member 113 and the inner mounting member 111 may have a step difference. That is, the inner mounting member 111 may protrude from the outer mounting member 113 in a Z direction. Accordingly, the outer mounting member 113 and the inner mounting member 111 may have the step difference at a position corresponding to the slit 117. The outer mounting member 113 and the inner mounting member 111 may be connected to each other through the bridge 115.

Alignment holes 119 are formed in the mounting member 110. Here, the alignment holes 119 penetrate through the mounting member 110. In addition, the alignment holes 118 include at least inner alignment hole 119a and at least one outer alignment hole 119b. The inner alignment hole 119a is formed in the inner mounting member 111. Here, the inner alignment hole 119a is formed in the inner mounting member 111 in correspondence with the inner region of the inner coil 120. The outer alignment hole 119b is formed in the outer mounting member 113. Here, the outer alignment hole 119b is formed in the outer region of the inner coil 120 and the inner region of the outer coil 130.

The inner coil 120 receives power according to the pre-set charging method. Here, the charging method of the inner coil 120 includes an electromagnetic induction method, a resonance method and a RF/Micro Wave Radiation method. At this time, the inner coil 120 operates in a predetermined operation frequency band to receive power. For example, if the electromagnetic induction method is set in correspondence with the inner coil 120, the operation frequency band of the inner coil 120 may be about 110 KHz to 205 KHz. Alternatively, if a resonance method is set in correspondence with the inner coil 120, the operation frequency band of the inner coil 120 may be about 6.78 MHz. Here, upon operating the inner coil 120, an electromagnetic field may be formed in the peripheral region of the inner coil 120. The inner coil 120 is mounted on the mounting member 110. At this time, the inner coil 120 is mounted on the inner mounting member 111. That is, the inner coil 120 is provided inside the slit 117. Here, the inner coil 120 exposes the inner alignment hole 119a of the mounting member 110. The inner coil 120 is formed on both surfaces, that is, the upper surface and the lower surface, of the mounting member 110. The inner coil 120 includes a first terminal 121, a first connection via 122, an inner extension bar 123, a second terminal 126, a second connection via 127 and an inner lead-out bar 128.

The first terminal 121 corresponds to one end of the inner coil 120 and is provided in the inner region of the inner coil 120. Here, the first terminal 121 may be provided on the upper surface of the mounting member 110. The first connection via 122 is connected to the first terminal 121 to penetrate through the mounting member 110. Here, the first connection via 122 may be connected to the first terminal 121 on the upper surface of the mounting member 110 to extend to the lower surface of the mounting member 110. The inner extension bar 123 is connected to the first connection via 122 to extend to the outer region of the inner coil 120. The inner extension bar 123 extends from the inner region to the outer region of the outer coil 130. Here, the inner extension bar 123 may be connected to the inner connection via 122 on the lower surface of the mounting member 110 to be provided on the lower surface of the mounting member 110.

The second terminal 126 corresponds to the other end of the inner coil 120 and is provided in the outer region of the inner coil 120. Here, the second terminal 126 may be provided on the lower surface of the mounting member 110. The second connection via 127 is connected to the second terminal 126 to penetrate through the mounting member 110. Here, the second connection via 127 may be connected to the second terminal 126 on the upper surface of the mounting member 110 to extend to the lower surface of the mounting member 110. The inner lead-out bar 128 is connected to the second connection via 127 to lead the second terminal 126 out. Here, the inner lead-out bar 128 may extend from the lower surface of the mounting member 110 to the outside of the outer coil 130.

The outer coil 130 transmits and receives a wireless signal according to a predetermined communication method. Here, the communication method may be a short-range communication method, e.g., an NFC method, and the outer coil 130 may be a short-range communication antenna, e.g., an NFC antenna. At this time, the outer coil 130 operates in a predetermined operation frequency band to transmit and receive a wireless signal. For example, the operation frequency band of the outer coil 130 may be about 13.56 MHz. Here, upon operating the outer coil 130, an electromagnetic field may be formed in the peripheral region of the outer coil 130.

Although an example in which the outer coil 130 transmits and receives a wireless signal is disclosed in this embodiment, the present invention is not limited thereto. That is, in this embodiment, the outer coil 130 may receive power according to implementation of the present invention. More specifically, the outer coil 130 may receive power according to a predetermined charging method. Here, the charging method of the outer coil 130 may include an electromagnetic induction method, a resonance method and a RF/Micro Wave Radiation method. The charging method of the outer coil 130 may be different from that of the inner coil 120. At this time, the outer coil 130 may operate in a predetermined operation frequency band to receive power. Here, upon operating the outer coil 130, an electromagnetic field may be formed in the peripheral region of the outer coil 130.

The outer coil 130 is provided outside the inner coil 120. At this time, the outer coil 130 surrounds the inner coil 120. The outer coil 130 is mounted on the mounting member 110. At this time, the outer coil 130 is mounted on the outer mounting member 113. Here, the outer coil 130 exposes the outer alignment hole 119b of the mounting member 110. That is, the outer coil 130 is provided outside the slit 117. In addition, the outer coil 130 is formed on both surfaces, that is, the upper surface and the lower surface, of the mounting member 110. In addition, the outer coil 130 includes a third terminal 131, a third connection via 132, an outer extension bar 133 and a fourth terminal 136.

The third terminal 131 corresponds to one end of the outer coil 130 and is provided in the inner region of the outer coil 130. Here, the third terminal 131 may be provided on the upper surface of the mounting member 110. The third connection via 132 is connected to the third terminal 131 to penetrate through the mounting member 110. Here, the third connection via 132 may be connected to the third terminal 131 on the upper surface of the mounting member 110 to extend to the lower surface of the mounting member 110. The outer extension bar 133 is connected to the third connection via 132 to extend to the outer region of the outer coil 130. Here, the outer extension bar 133 may be connected to the outer connection via 132 on the lower surface of the mounting member 110 to be provided on the lower surface of the mounting member 110.

The fourth terminal 136 corresponds to the other end of the outer coil 130 and is provided in the outer region of the outer coil 120. Here, the fourth terminal 136 may be provided on the lower surface of the mounting member 110.

The shielding member 140 isolates the inner coil 120 and the outer coil 130. That is, the shielding member 140 isolates the inner coil 120 and the outer coil 130 from the other components of the wireless power reception device. At this time, the shielding member 140 protrudes upward in correspondence with the inner coil 120. Here, the shielding member 140 has a step difference in correspondence with the edge of the inner coil 120, that is, the slit 117 of the mounting member 110. To this end, the shielding member 140 includes a first shielding member 141 and a second shielding member 145.

The first shielding member 141 is provided for the outer coil 130. At this time, the first shielding member 141 supports the second shielding member 145, the mounting member 110, the inner coil 120 and the outer coil 130. The first shielding member 141 isolates the outer coil 130. At this time, the first shielding member 141 shields the operation frequency band of the outer coil 130. That is, upon operating the outer coil 130, the first shielding member 141 blocks the electromagnetic field of the outer coil 130.

Alignment holes 143 are formed in the first shielding member 141. Here, the alignment holes 143 penetrate through the first shielding member 141. The alignment holes 143 include at least one inner alignment hole 143a and at least one outer alignment hole 143b. The inner alignment hole 143a is formed in correspondence with the inner alignment hole 119a of the mounting member 110. Here, the inner alignment hole 143a is located on the same axis as the inner alignment hole 119a of the mounting member 110. The outer alignment hole 143b is formed in correspondence with the outer alignment hole 119b of the mounting member 110. Here, the outer alignment hole 143b is located on the same axis as the outer alignment hole 119b of the mounting member 110.

The second shielding member 145 is provided for the inner coil 120. At this time, the second shielding member 145 supports the inner mounting member 111 and the inner coil 120 on the mounting member 110. In addition, the second shielding member 145 isolates the inner coil 120. Here, the second shielding member 145 shields the operation frequency band of the inner coil 120. That is, upon operating the inner coil 120, the second shielding member 145 blocks the electromagnetic field of the inner coil 120.

The second shielding member 145 is laminated on the first shielding member 141. At this time, the second shielding member 145 is provided in correspondence with the inner coil 120. Here, the second shielding member 145 may have an area corresponding to that of the inner mounting member 111. The second shielding member 145 may have a thickness corresponding to the width of the slit 117, that is, the length of the bridge 115 traversing the slit 117, of the mounting member 110.

At least one inner alignment hole 147 is formed in the second shielding member 145. Here, the inner alignment hole 147 penetrates through the second shielding member 145. In addition, the inner alignment hole 147 is formed in correspondence with the inner alignment hole 119a of the mounting member 110 and the inner alignment hole 143a of the first shielding member 141. Here, the inner alignment hole 147 is located on the same axis as the inner alignment hole 119a of the mounting member 110 and the inner alignment hole 143a of the first shielding member 141.

At this time, the first shielding member 141 and the second shielding member 145 may have different physical properties. Here, the first shielding member 141 and the second shielding member 145 may different permeabilities μ. The permeability of the first shielding member 141 may be maintained in a resonance frequency band of the outer coil 130. To this end, it is possible to suppress the loss rate of the first shielding member 141 in the resonance frequency band of the outer coil 130. The permeability of the second shielding member 145 may be maintained in a resonance frequency band of the inner coil 120. To this end, it is possible to suppress the loss rate of the second shielding member 145 in the resonance frequency band of the inner coil 120.

The shielding member 140 may be composed of ferrite. That is, the shielding member 140 may include metal powders and a resin material. Here, the metal powders may include soft ferrite metal powers, aluminum (Al), metal silicon, iron oxide (FeO; Fe3O4; Fe2O3), etc. In addition, the resin material may include thermoplastic resin, e.g., polyolefin elastomer. At this time, the metal powders of the first shielding member 141 may be different from those of the second shielding member 145. Meanwhile, the metal powders of the first shielding member 141 may be equal to that of the second shielding member 145. However, the weight ratio of the first shielding member 141 may be different from that of the second shielding member 145. Alternatively, the mixture ratio of the metal powders of the first shielding member 141 may be different from that of the metal powders of the second shielding member 145. In addition, the first shielding member 141 and the second shielding member 145 may have the same thickness or different thicknesses.

The cover 150 protects the mounting member 110, the inner coil 120, the outer coil 130 and the shielding member 140. At this time, the upper and lower surfaces of the cover 150 may be planar. Alternatively, at least one of the upper surface or the lower surface of the cover 150 may be curved. Here, at least one of the upper surface or the lower surface of the cover 150 may be convexly formed in the upper direction.

The cover 150 may be provided on the mounting member 110, the inner coil 120 and the outer coil 130. An inner accommodation groove 151 and an outer accommodation groove 153 are formed in the cover 150. Here, the inner accommodation groove 151 and the outer accommodation groove 153 are concavely formed in the upper direction. In addition, the depth of the inner accommodation groove 151 is equal to or greater than that of the outer accommodation groove 153. The inner accommodation groove 151 is formed in the inner side of the cover 150. At this time, the inner accommodation groove 151 is located in correspondence with the inner coil 120 and the inner mounting member 113. In addition, the inner accommodation groove 151 accommodates at least portions of the inner coil 120, the inner mounting member 111 and the second shielding member 145. That is, the inner accommodation groove 151 may accommodate the inner coil 120 provided on the inner mounting member 113 protruding from the outer mounting member 113 in a Z direction. In addition, the outer accommodation groove 153 is located in correspondence with the outer coil 130 and the outer mounting member 113. Here, the outer accommodation groove 153 surrounds the inner accommodation groove 151. In addition, the outer accommodation groove 153 accommodates at least portions of the outer coil 130, the outer mounting member 113 and the first shielding member 141.

Although not shown, the coil part 100 of this embodiment may further include an adhesion part (not shown). The adhesion part may be interposed between the mounting member 110 and the shielding member 140. That is, the adhesion part may adhere the mounting member 110 and the inner coil 120, the outer coil 130 and the shielding member 140 on the lower surface of the mounting member 110. At this time, an opened region may be formed in the adhesion part in correspondence with the slit 117 of the mounting member 110. In addition, the adhesion part may include an inner adhesion part and an outer adhesion part. The inner adhesion part may be disposed between the inner mounting member 111 and the second shielding member 145 and the outer adhesion part may be disposed between the outer mounting member 113 and the first shielding member 141. Here, the inner adhesion part and the outer adhesion part may be connected to or separated from each other.

Although not shown, the coil part 100 of this embodiment may further include a protection part (not shown). The protection part may protect the mounting member 110, the inner coil 120 and the outer coil 130 on the upper surface of the mounting member 110. At this time, an opened region may be formed in the protection part in correspondence with the slit 117 of the mounting member 110. The protection part may include an inner protection part and an outer protection part. The inner protection part may cover the inner mounting member 111 and the inner coil 120, and the outer protection part may cover the outer mounting member 113 and the outer coil 130. Here, the inner protection part and the outer protection part may be connected to or separated from each other.

Although an example in which one inner coil 120 is mounted on the inner mounting member 111 is disclosed in the above-described embodiment, the present invention is not limited thereto. That is, a plurality of inner coils 120 may be mounted on the inner mounting member 111 according to the implementation of the present invention. For example, two inner coils 120 may be mounted on the inner mounting member 111. At this time, the inner coils 120 may receive power according to different charging methods. The inner coils 120 may be provided inside of the slit 117. In addition, any one of the inner coils 120 may surround the other of the inner coils 120. Here, the inner coils 120 may expose the inner alignment holes 119a of the mounting member 110.

Although an example in which one outer coil 130 is mounted on the outer mounting member 113 is disclosed in the above-described embodiment, the present invention is not limited thereto. That is, a plurality of outer coils 130 may be mounted on the outer mounting member 113 according to the implementation of the present invention. For example, two outer coils 130 may be mounted on the outer mounting member 113. At this time, the outer coils 130 may receive power according to different charging methods. Alternatively, any one of the outer coils 130 may transmit and receive a wireless signal according to a predetermined communication method and the other of the outer coils 130 may receive power according to a predetermined charging method. The outer coils 130 may be provided outside the slit 117. In addition, any one of the outer coils 130 may surround the other of the outer coils 130. Here, the outer coils 130 may expose the outer alignment hole 119b of the mounting member 110.

Although an example in which most of the inner coil 120 and the outer coil 130 is provided on the upper surface of the mounting member 110 and ends of the inner coil 120 and the outer coil 130 are provided on the upper and lower surfaces of the mounting member 110 is disclosed in the above-described embodiment, the present invention is not limited thereto. That is, most of the inner coil 120 and the outer coil 130 may be provided on the lower surface of the mounting member 110 according to implementation of the present invention. In this case, the ends of the inner coil 120 and the outer coil 130 are provided on the upper and lower surfaces of the mounting member 110. For example, in the inner coil 120, the first terminal 121 is provided on the lower surface of the mounting member 110, the inner extension bar 123 is provided on the upper surface of the mounting member 110, the second terminal 126 is provided on the upper surface of the mounting member 110, and the inner lead-out bar 128 may be provided on the upper surface of the mounting member 110. In the outer coil 130, the third terminal 131 may be provided on the lower surface of the mounting member 110, the outer extension bar 133 may be provided on the upper surface of the mounting member 110, and the fourth terminal 136 may be provided on the upper surface of the mounting member 110.

According to the present invention, the second shielding member 145 is laminated on the first shielding member 141. Here, the inner alignment hole 143a of the first shielding member 141 and the inner alignment hole 147 of the second shielding member 145 are aligned along the same axis. The mounting member 110 are mounted on the first shielding member 141 and the second shielding member 145. Here, the inner alignment hole 119a of the mounting member 110 is aligned along the same axis as the inner alignment hole 143a of the first shielding member 141 and the inner alignment hole 147 of the second shielding member 145. In addition, the outer alignment hole 119b of the mounting member 110 is aligned along the same axis as the outer alignment hole 143b of the first shielding member 141. To this end, the first shielding member 141, the second shielding member 145 and the mounting member 110 may be accurately positioned. Further, in the wireless power reception device, the inner coil 120 and the outer coil 130 may be aligned at desired positions in correspondence with the wireless power transmission device. To this end, the wireless power reception device may efficiently receive power.

A step difference is formed between the first shielding member 141 and the second shielding member 145. In addition, the slit 117 of the mounting member 110 accommodate the step difference of the shielding member 140. To this end, the mounting member 110 is flexibly mounted on the shielding member 140. Accordingly, at least portions of the mounting member 110, the inner coil 120, the outer coil 130 and the shielding member 140 may be accommodated in the cover 150 regardless of the shape of the cover 150. That is, as the lower surface of the cover 150 is curved, at least portions of the mounting member 110, the inner coil 120, the outer coil 130 and the shielding member 140 may be accommodated in the cover 150. In addition, although the lower surface of the cover 150 is formed in a planar shape, at least portions of the mounting member 110, the inner coil 120, the outer coil 130 and the shielding member 140 may be accommodated in the cover 150. Here, at least portions of the mounting member 110, the inner coil 120, the outer coil 130 and the shielding member 140 may be accommodated in at least one of the inner accommodation groove 151 or the outer accommodation groove 153 of the cover 150. The shape of the cover 150 may be variously designed.

The shielding member 140 shields the electromagnetic fields of the inner coil 120 and the outer coil 130. That is, the shielding member 140 isolates the inner coil 120 and the outer coil 130 from the other components of the wireless power reception device. To this end, the inner coil 120 and the outer coil 130 may operate without performance deterioration. In addition, when the inner coil 120 and the outer coil 130 operate, the shielding member 140 protect the other components of the wireless power reception device from the electromagnetic field. To this end, the wireless power reception device may receive power according to the plurality of charging methods. Accordingly, it is possible to improve efficiency of the wireless power reception device.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention may be used in the wireless power charging field related to transmission and reception units capable of wirelessly transmitting and receiving power and a wireless power transmission system including the same.

The invention claimed is:

1. A wireless power reception device, comprising:
a first shielding member;
a second shielding member;
a short-range communication coil on the first shielding member;
a wireless charging coil on the second shielding member, wherein the wireless charging coil is disposed inside of the short-range communication coil; and
a hole outside the wireless charging coil between the short-range communication coil and the wireless charging coil,
wherein the hole penetrates through the first shielding member.

2. The wireless power reception device according to claim 1, wherein the hole is disposed outside of the second shielding member.

3. The wireless power reception device according to claim 1, further comprising a mounting member,
wherein the first and second shielding members are disposed on the mounting member.

4. The wireless power reception device according to claim 3, wherein the hole penetrates through the first shielding member and the mounting member.

5. The wireless power reception device according to claim 1, wherein the second shielding member has a curved edge portion,
wherein the short-range communication coil includes at least one outer corner portion, and
wherein the hole in the first shielding member is disposed closer to the curved edge portion of the second shielding member than the at least one outer corner portion of the short-range communication coil.

6. The wireless power reception device according to claim 1, wherein the wireless charging coil has a curved outer edge,
wherein the short-range communication coil includes at least one outer corner portion, and
wherein the hole in the first shielding member is disposed closer to the curved outer edge of the wireless charging coil than the at least one outer corner portion of the short-range communication coil.

7. The wireless power reception device according to claim 1, wherein the short-range communication coil has a rectangular shape, and
wherein the wireless charging coil has a rectangular shape.

8. The wireless power reception device according to claim 1, wherein a permeability of the first shielding member is different from a permeability of the second shielding member.

9. The wireless power reception device according to claim 1, further comprising an adhesion part disposed between the first mounting member and the shielding member, wherein the hole penetrates through the adhesion part.

10. The wireless power reception device according to claim 1, wherein the wireless charging coil is disposed inside of the short-range communication coil such that an outermost portion of the wireless charging coil is smaller than the innermost portion of the short-range communication coil.

11. The wireless power reception device according to claim 10, wherein the wireless charging coil and the short-range communication coil are approximately circular and an outermost circumference of the wireless charging coil is smaller than the innermost circumference of the short-range communication coil.

12. A wireless power reception device, comprising:
a first shielding member;
a second shielding member;
a short-range communication coil on the first shielding member;
a wireless charging coil on the second shielding member in an area inside a perimeter of the short-range communication coil; and
a hole outside the wireless charging coil and the second shielding member,
wherein the hole penetrates through the first shielding member,
wherein the hole is disposed between the short-range communication coil and the wireless charging coil, and
wherein the hole is outside of the second shielding member.

13. The wireless power reception device according to claim 12, further comprising a mounting member,
wherein the first and second shielding members are disposed on the mounting member.

14. The wireless power reception device according to claim 13, wherein the hole penetrates through the first shielding member and the mounting member.

15. The wireless power reception device according to claim 12, wherein the second shielding member has a curved edge portion,
wherein the short-range communication coil includes at least one outer corner portion, and
wherein the hole in the first shielding member is disposed closer to the curved edge portion of the second shielding member than the at least one outer corner portion of the short-range communication coil.

16. A wireless power reception device, comprising:
a first shielding member;
a mounting member on the first shielding member;
a short-range communication coil on the mounting member;
a wireless charging coil inside the short-range communication coil;
a second shielding member on the wireless charging coil; and
a hole outside the wireless charging coil between the short-range communication coil and the wireless charging coil,
wherein the hole penetrates through the first shielding member.

17. The wireless power reception device according to claim 16, wherein the hole penetrates through the mounting member.

18. The wireless power reception device according to claim 16, wherein the second shielding member has a curved edge portion,
wherein the short-range communication coil includes at least one outer corner portion, and
wherein the hole in the first shielding member is disposed closer to the curved edge portion of the second shielding member than the at least one outer corner portion of the short-range communication coil.

19. The wireless power reception device according to claim 16, wherein the wireless charging coil has a curved outer edge,
wherein the short-range communication coil includes at least one outer corner portion, and
wherein the hole in the first shielding member is disposed closer to the curved outer edge of the wireless charging coil than the at least one outer corner portion of the short-range communication coil.

20. The wireless power reception device according to claim 16, wherein the wireless charging coil is disposed inside of the short-range communication coil such that an outermost portion of the wireless charging coil is smaller than the innermost portion of the short-range communication coil.

* * * * *